United States Patent
Lu et al.

(10) Patent No.: US 9,763,191 B2
(45) Date of Patent: *Sep. 12, 2017

(54) METHODS AND APPARATUSES FOR COMMUNICATION BETWEEN A MOBILE TERMINAL AND A BASE STATION DURING A RANDOM ACCESS PROCEDURE

(71) Applicant: Telefonaktiebolaget LM Ericsson (publ), Stockholm (SE)

(72) Inventors: Qianxi Lu, Beijing (CN); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,396

(22) Filed: Oct. 17, 2016

(65) Prior Publication Data

US 2017/0034782 A1    Feb. 2, 2017

Related U.S. Application Data

(63) Continuation of application No. 14/381,790, filed as application No. PCT/CN2012/070810 on Apr. 20, 2012, now Pat. No. 9,503,982.

(51) Int. Cl.
*H04W 52/02*    (2009.01)
*H04W 76/04*    (2009.01)
(Continued)

(52) U.S. Cl.
CPC ... *H04W 52/0229* (2013.01); *H04W 28/0221* (2013.01); *H04W 52/0212* (2013.01);
(Continued)

(58) Field of Classification Search
None
See application file for complete search history.

(56) References Cited

U.S. PATENT DOCUMENTS 7,933,243 B2    4/2011    Yi
8,428,013 B2    4/2013    Lee
(Continued)

FOREIGN PATENT DOCUMENTS

| CN | 102300297 | 12/2011 |
|---|---|---|
| EP | 2761967 A1 | 8/2014 |
| WO | 2010/111820 | 10/2010 |

OTHER PUBLICATIONS

Extended Search Report issued by the European Patent Office, EP Application No. 12874436.4 (EP Publication No. 2 839 708) issued Dec. 23, 2015.
(Continued)

*Primary Examiner* — Andrew Lai
*Assistant Examiner* — Jamaal Henson
(74) *Attorney, Agent, or Firm* — Baker Botts, LLP (57) ABSTRACT

The disclosure relates to a method in a mobile terminal for communication with a base station in a wireless network during a random access procedure. The method comprises exchanging (202) between the mobile station and the base station, during the random access procedure, information on a selected DRX scheme to be used for communication between the mobile terminal and the base station in the random access procedure, setting (204) the mobile terminal in DRX mode according to the selected DRX scheme and receiving (206) at least one message from the base station during the random access procedure, wherein the at least one message was transmitted according to the selected DRX scheme. The disclosure also relates to a corresponding method in a base station, and to a mobile terminal and a base station. By such methods, base station and mobile terminals, battery power in a mobile terminal may be saved during a random access procedure.

10 Claims, 8 Drawing Sheets

(51) Int. Cl.
  *H04W 28/02* (2009.01)
  *H04W 74/08* (2009.01)
  *H04W 74/00* (2009.01)

(52) U.S. Cl.
  CPC ... *H04W 52/0216* (2013.01); *H04W 52/0235* (2013.01); *H04W 74/004* (2013.01); *H04W 74/006* (2013.01); *H04W 74/0833* (2013.01); *H04W 76/048* (2013.01); *H04W 74/002* (2013.01); *Y02B 60/50* (2013.01)

(56) References Cited

U.S. PATENT DOCUMENTS

| | | | |
|---|---|---|---|
| 8,442,017 B2 | 5/2013 | Lee | |
| 8,626,167 B2 | 1/2014 | Futaki | |
| 2008/0267105 A1* | 10/2008 | Wang | H04W 52/0225 370/311 |
| 2009/0262680 A1* | 10/2009 | Choi | H04W 74/004 370/328 |
| 2010/0130237 A1 | 5/2010 | Kitazoe | |
| 2012/0243417 A1 | 9/2012 | Henttonen | |
| 2013/0084848 A1* | 4/2013 | Dalsgaard | H04W 76/048 455/422.1 |
| 2013/0242730 A1 | 9/2013 | Pelletier | |

OTHER PUBLICATIONS

PCT International Search Report with Written Opinion of the Searching Examiner (ISA/210, ISA/220 and ISA/237) PCT/CN2012/070810 issued Jan. 31, 2013.

3GPP TSG RAN Meeting #51; Kansas City, US; Title: New Work Item Proposal for LTE RAN Enhancements for Diverse Data Applications; RP-110454.

European Patent Office Communication pursuant to Article 94(3) EPC, Application No. 12874436.4-1875, Date Feb. 14, 2017, 4 pages.

* cited by examiner

METHODS AND APPARATUSES FOR COMMUNICATION BETWEEN A MOBILE TERMINAL AND A BASE STATION DURING A RANDOM ACCESS PROCEDURE

PRIORITY

This application is a continuation, under 35 U.S.C. §120, of U.S. patent application Ser. No. 14/381,790 filed Aug. 28, 2014, which is a U.S. National Stage Filing under 35 U.S.C. §371 of International Patent Application Serial No. PCT/CN2012/070810, filed Apr. 20, 2012 and entitled "Methods and Apparatuses for Communication Between a Mobile Terminal and a Base Station During a Random Access Procedure" the entire contents of which are incorporated herein by reference.

TECHNICAL FIELD

The present disclosure relates generally to methods and an apparatuses for communication between a mobile terminal and a base station during a random access procedure.

BACKGROUND

With an increased number of user equipments (UEs) such as smart phones in mobile networks, network operators are confronted with a number of new challenges. For example, users of smart phones require an experience of being always on-line, similar to the experience of being connected to the Internet via a personal computer. This always on-line experience means short reaction time for data arrival and data transmission. A natural way of solving this would be to let all smart phones in the network be always connected to the network, i.e. for a Long Term Evolution (LTE) network the smart phones would always be in the RRC_Connected state. Although, to let the smart phones be always connected consumes a lot of network resources and UE battery power.

One reason for high UE power consumption and consumption of network resources is the network controlled handover procedure for users in the RRC_Connected state. Such handover procedures cause UE random access procedure operations and RRC reconfiguration operations which increase UE power consumption and network signaling costs. This is especially true when there are many smart phones in a cell and many of them are moving with a high speed (e.g. on a train).

Figure 1A:
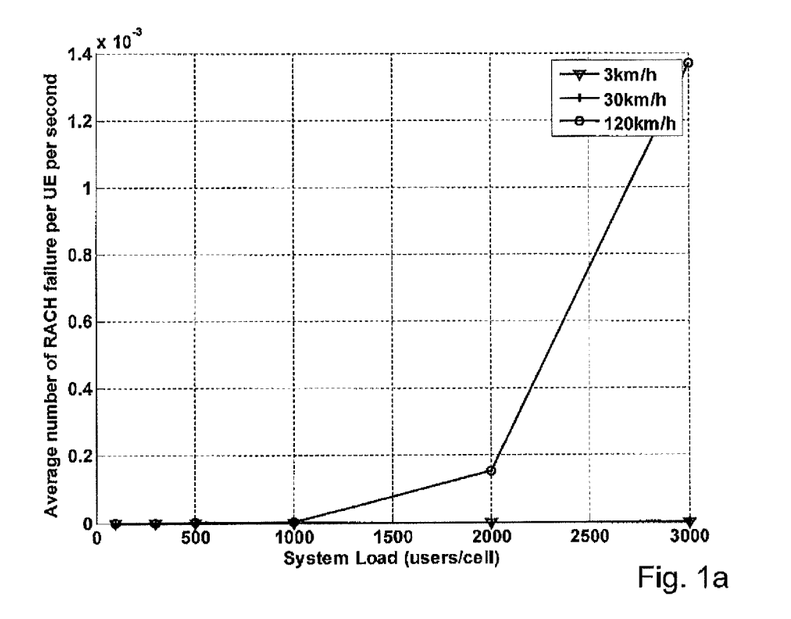
FIG. 1*a* is a diagram showing the relation between system load and average number of RACH failures per UE per second for UEs having different velocities, in a prior art system.
Figure 1B:
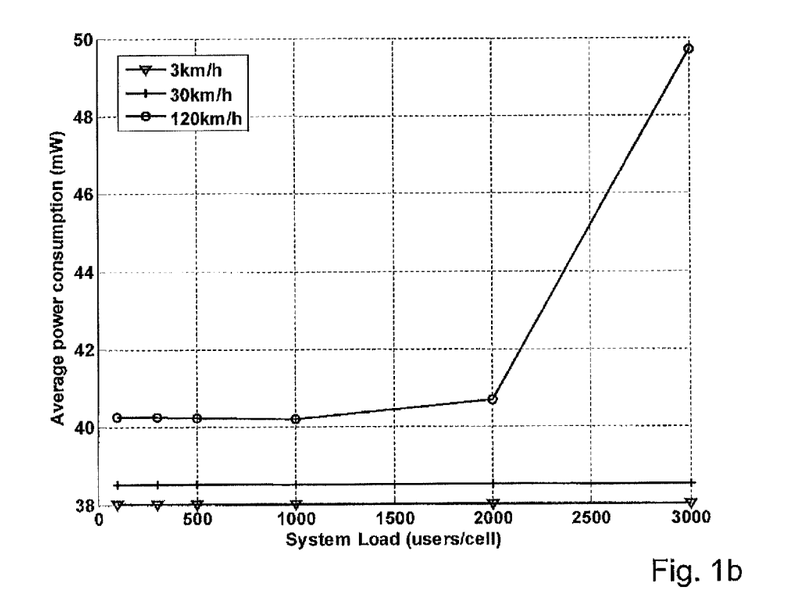
FIG. 1*b* is a diagram showing the relation between system load and average UE power consumption for UEs having different velocities, in a prior art system.

FIGS. 1a and 1b show simulation results for random access channel (RACH) failure and power consumption for mobile terminals travelling in a network, wherein the mobile terminals are simulated to have the same velocity at a simulation, but different velocity between each simulation. As could be seen in FIG. 1a, the number of random access failures, i.e. the number of times a random access attempt does not succeed, would largely increase when the number of smart phones in a cell increases from around 2000 smart phones/cell when the smart phones travel at 120 km/h. The random access failures are caused by many simultaneous random access attempts, at the same time as there are a limited number of preambles dedicated for handover, which leads to random access channel decoding error and collisions. As could be seen in FIG. 1b, the increase in random access failures is followed by a similar increase in UE power consumption. This is at least partly because a UE consumes lots of power when it is performing a random access procedure and because the random access failure is followed by a new random access attempt until the random access procedure is succeeded.

US2009457653 shows a procedure in which the UE is in sleep mode in a so called back-off period, which is a period between two consecutive random access procedures that may occur due to a random access failure. By setting the UE in sleep mode in the back-off periods, UE power consumption at random access procedures is decreased.

Although, there is still a need to decrease the UE power consumption at random access procedures.

SUMMARY

It is an object of the invention to address at least some of the problems and issues outlined above. It is possible to achieve these objects and others by using a method and an apparatus as defined in the attached independent claims.

According to one aspect, a method is provided in a mobile terminal for communication with a base station in a wireless network during a random access procedure. The method comprises exchanging, between the mobile terminal and the base station, during the random access procedure, information on a selected DRX scheme to be used for communication between the mobile terminal and the base station in the random access procedure, setting the mobile terminal in DRX mode according to the selected DRX scheme and receiving at least one message from the base station during the random access procedure, wherein the at least one message was transmitted according to the selected DRX scheme. When the mobile terminal is set in DRX mode it is set to be in sleep mode except for in certain time intervals when it is set to wake up and listen to signals sent from a BS. The DRX scheme defines at which time intervals the mobile terminal should be awake and listen to signals from the BS. When the BS and the MT has exchanged DRX scheme, the BS may only send signals destined to the MS at the time intervals defined by the DRX scheme. The method in the mobile terminal may further comprise the step of waking up from a sleep mode at time points or time intervals defined by the DRX scheme to receive messages from the base station during the random access procedure.

By exchanging information on DRX scheme to be used between the mobile terminal and the base station and by receiving messages from the base station according to the exchanged DRX scheme during the random access procedure, it is possible for the mobile terminal to be in sleep mode during the random access procedure and only wake up at time intervals when the base station may transmit according to the exchanged DRX scheme. Thereby, mobile terminal power may be saved during a random access procedure.

Also, by enabling DRX during a random access procedure, air interface resources are saved. Further, by enabling DRX during a random access procedure it is possible to prioritize between high and low priority users during a random access procedure. For example, low priority users may have DRX enabled during a random access procedure, and high priority users may monitor continuously during the response window and contention resolution timer. As another example, low priority user may be set with a DRX scheme with few and short awake periods for the receiver to listen to signals and high priority users may be set with a DRX scheme with more frequent and/or longer awake periods. Examples of low priority users are machine type communication or machine to machine communication, which are in general delay tolerant. Without applying embodiments of this disclosure, a scheduler cannot distinguish a low priority user from a normal UE and will handle the low priority user equal to the normal UE which affect normal UE performance. And even if a scheduler can distinguish a low priority user from a normal UE, without applying embodiments of this disclosure, both low and high priority user will have to monitor continuously.

According to another aspect, a method in a base station is provided for communication with a mobile terminal in a wireless network during a random access procedure. The method comprises exchanging, during the random access procedure, between the mobile station and the base station, information on a selected DRX scheme to be used for communication between the mobile terminal and the base station in the random access procedure, setting the base station in a DRX mode according to the selected DRX scheme, and transmitting at least one message to the mobile terminal during the random access procedure, wherein the at least one message is transmitted according to the selected DRX scheme.

According to a third aspect, a mobile terminal is provided for communication with a base station in a wireless network during a random access procedure. The mobile terminal is arranged for exchanging, during the random access procedure, with the base station, information on a selected DRX scheme to be used for communication between the mobile terminal and the base station in the random access procedure. The mobile terminal further comprises a setting unit for setting the mobile terminal in DRX mode according to the selected DRX scheme, and a receiver for receiving at least one message from the base station during the random access procedure, wherein the at least one message was transmitted according to the selected DRX scheme.

According to a fourth aspect, a base station is provided for communication with a mobile terminal in a wireless network during a random access procedure. The base station is arranged for exchanging, during the random access procedure, with the mobile terminal, information on a selected DRX scheme to be used for communication between the mobile terminal and the base station in the random access procedure. The base station further comprises a setting unit for setting the base station in a DRX mode according to the selected DRX scheme, and a transmitter for transmitting at least one message to the mobile terminal during the random access procedure, wherein the at least one message is transmitted according to the selected DRX scheme.

The above methods, mobile stations and base stations may be configured and implemented according to different optional embodiments. In one possible embodiment, the information on the selected DRX scheme is exchanged by the base station sending the information of selected DRX scheme to the mobile terminal. I.e. the selection of DRX scheme is controlled by the base station. In another embodiment, the information on the selected DRX scheme is exchanged by the mobile station selecting a preamble which is mapped to a certain DRX scheme, and thereafter sending the preamble to the base station. Since the mapping is known to both the mobile terminal and the base station, the base station will know the selected DRX scheme when receiving the preamble. I.e. this selection of DRX scheme is controlled by the mobile terminal.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Based on the understanding that power consumption of a UE during a random access procedure may be a critical issue, especially for e.g. certain traffic cases resulting in many reoccurring random access procedures, the inventors have come up with different suggestions of how to enable DRX mode in an ongoing random access procedure.

Briefly described, a solution is provided for decreasing UE power consumption during a random access procedure. This is achieved by exchanging information on a DRX scheme to be used between the UE and the base station in communication with the UE during the random access procedure and setting the UE and the base station in DRX mode according to the exchanged DRX scheme. Thereafter the base station transmits at least one message during the random access procedure according to the exchanged DRX scheme. Since the UE and the BS have exchanged information on DRX scheme, the UE knows the moments in time when the at least one message may be transmitted and the UE only needs to wake up to listen for a message from the base station at the moments in time defined by the DRX scheme. Thereby, UE power is saved.

A random access procedure may be performed in e.g. the following situations: when performing an initial access when there is no RRC connection with the base station; upon initial access to a target cell while the UE is in a handover process; upon request by a command of the base station; during a correction procedure when there is radio link failure or handover failure. A random access procedure can also be triggered to acquire a UL grant or a Timing Advance (TA) command etc.

Figure 2:
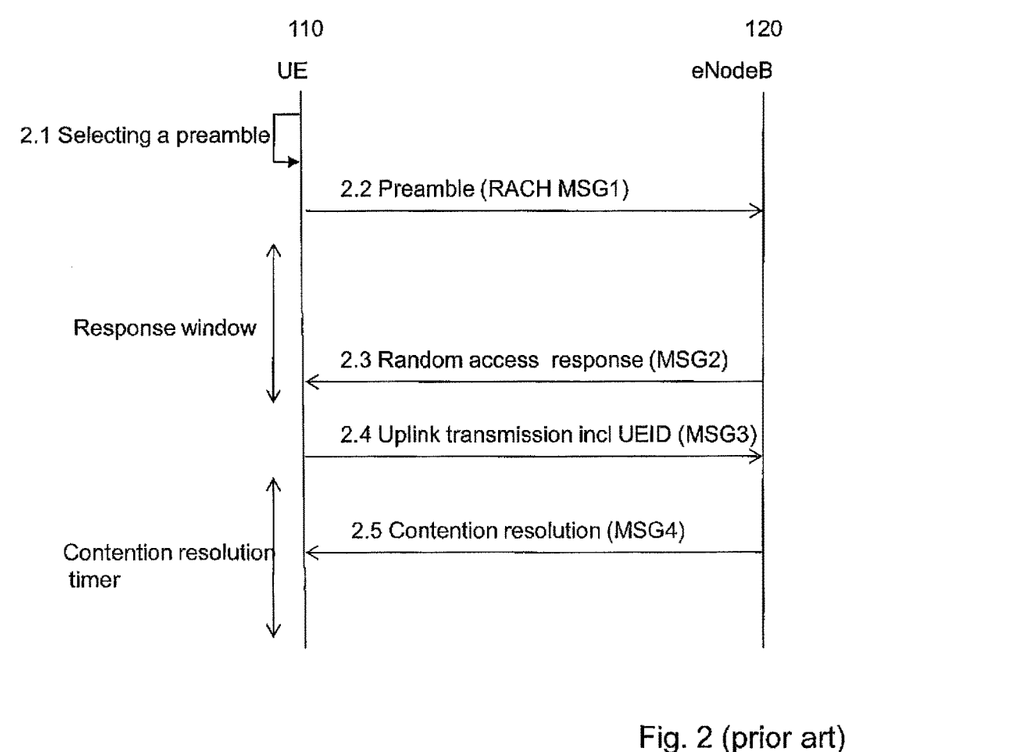
FIG. 2 is a signaling diagram of a random access procedure according to prior art.

The full random access procedure according to the current LTE protocol 3GPP TS 36.321, E-UTRA, Medium Access Control (MAC) protocol specification is shown in FIG. 2. According to the protocol, the UE 110 selects 2.1 a preamble (contention-based preamble), or use an indicated preamble (non contention-based preamble) and sends 2.2 the preamble to the eNodeB 120. Then the UE actively listens for a random access response message (MSG2) 2.3 from the eNodeB during a response time window. During this window the UE consumes power for the listening process. When the UE has received the random access response message, the information included in the random access response message is individually processed. If the random access procedure is a contention-based procedure, an uplink transmission 2.4 including a UE identifier is sent to the eNodeB. If the random access procedure is a non contention-based procedure, the process may end after step 2.3. Before receiving 2.5 the contention resolution message (MSG4) from the eNodeB, the UE actively listens for this message during a time period defined by a contention resolution timer. According to an embodiment, this invention is directed to decreasing power consumption during at least one of the response window and the contention resolution timer window.

According to the current 3GPP standard, a UE can be configured with DRX mode for saving power consumption. Although there is no suggestion to use DRX mode in a random access procedure. Also, the DRX can only be configured by RRC signaling, i.e. an RRC connection has to be set up before DRX can be applied. Therefore, during an initial random access procedure where no RRC connection exists, DRX cannot be applied. Also, the current LTE standard defines the intervals of Response Window Size and Contention Resolution Timer as an active time period, i.e. always-on monitoring is required. Thus, even if a random access procedure is initialized due to e.g. an out-of-sync state in RRC-Connected mode, DRX in a random access procedure cannot be applied.

To reduce power consumption at a random access procedure according to an embodiment of the invention, a DRX scheme is exchanged between the UE and the eNodeB during the random access procedure such that a message transmitted during the random access procedure may be transmitted to the UE according to the exchanged DRX scheme. The message transmitted according to the exchanged DRX scheme may be a random access response message (MSG2) and/or a contention resolution message (MSG4). According to an embodiment, the DRX scheme is exchanged by the eNodeB instructing the UE of the selected DRX scheme to use. According to another embodiment, the DRX scheme is exchanged by the UE selecting DRX scheme by selecting a preamble which has a predefined relationship to a certain DRX scheme, and sending the preamble to the eNodeB.

Figure 3:
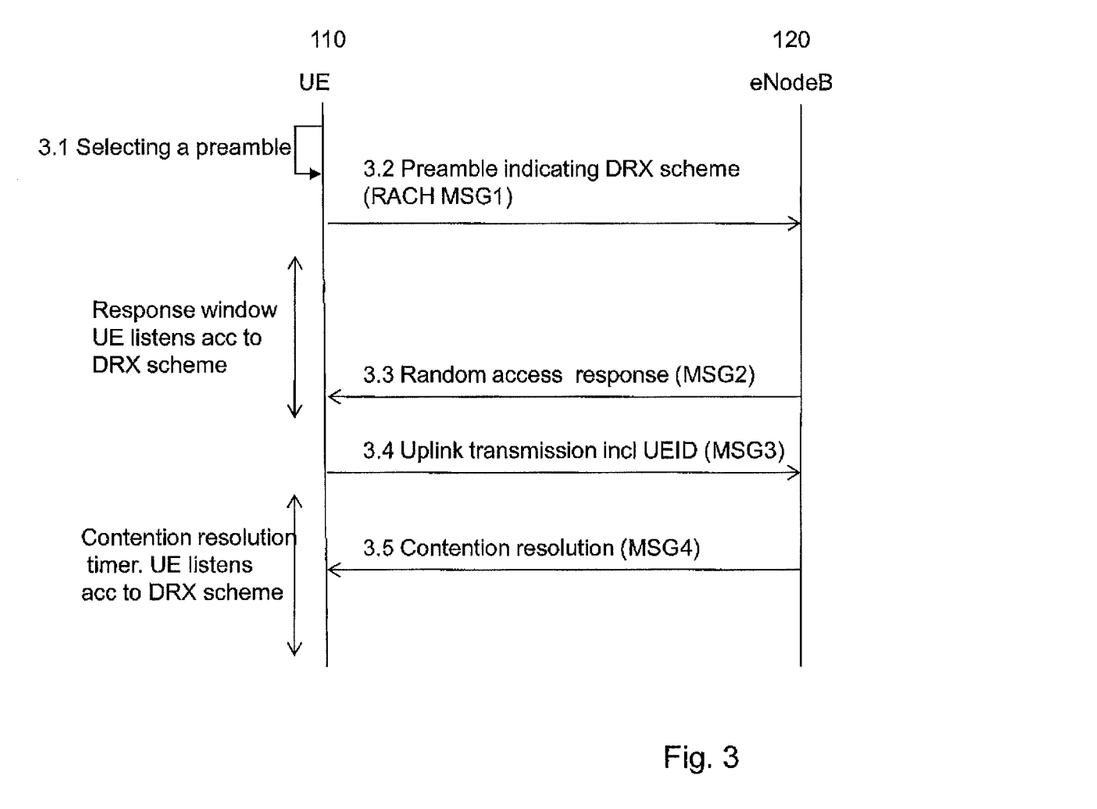
FIG. 3 is a signaling diagram of a random access procedure according to a possible embodiment of the invention.

A signaling diagram describing signaling between a UE 110 and an eNodeB 120 during a random access procedure according to an embodiment is shown in FIG. 3. In this embodiment, a DRX scheme is selected by the UE for the reception of at least a contention resolution message. The signaling starts by the UE selecting 3.1 a random access preamble. Since there is a predefined mapping relationship between the random access preambles and different DRX schemes, the UE when selecting a preamble also selects a DRX scheme to be used for later transmission in DRX mode from the eNodeB to the UE. The selected DRX scheme defines e.g. the time intervals of active/inactive periods for the UE and time offset of the starting point for DRX transmission/reception. The UE transmits 3.2 the preamble to the eNodeB. Since the eNodeB knows the mapping between the preambles and the DRX scheme, the eNodeB would be informed of the selected DRX scheme when receiving the preamble.

The eNodeB then sends 3.3 a random access response (MSG2) to the UE. The information in the random access response may include a Time advance command, UL grant and a temporary Cell Radio Network Temporary Identity value (C-RNTI). If the UE and the eNodeB have been set in DRX mode according to the DRX scheme of the preamble, the MSG2 may be sent according to the DRX mode. In this case, the UE is in DRX mode during the response window when the MSG2 may be received, and only wakes up to listen to possible MSG2s at the active periods defined by the DRX scheme.

Thereafter, the UE sends 3.4 the UE identifier to the eNodeB in an uplink transmission (MSG3). As soon as the MSG3 is sent, the UE listens to a contention resolution message (MSG4) according to the selected DRX scheme. The eNodeB then responds 3.5 to the MSG3 with the MSG4. The MSG4 is sent in an active period as defined by the DRX scheme. The random access procedure succeeds after successful reception of MSG4. If not succeeded, the random access procedure and the DRX mode according to the selected DRX scheme is stopped in order to retry to access again.

The step of predefining a mapping relationship between the random access preambles and the DRX schemes may either be hardcoded, e.g. defined in a future specification, or broadcasted by the eNodeB beforehand, e.g. as system information. By predefining a mapping relationship between the preambles and the DRX schemes, no extra signaling is needed for UE UL transmission, i.e. there is no impact on coverage performance. The mapping may be defined for different values of response window size and/or contention resolution timer such that correct DRX scheme may be selected adapted to a certain response window size and/or contention resolution timer.

For the UE to select different DRX schemes, e.g. different DRX cycles and time offsets, different information could be taken into account, such as UL traffic Quality of Service information and UE power status.

According to an alternative embodiment, the eNodeB may control the usage of DRX scheme even in this UE controlled embodiment. In this case, the eNodeB sends an instruction to the UE to use the selected DRX scheme or another DRX scheme. This instruction may be sent in the random access response message. In case the eNodeB sends an instruction to use another DRX scheme, the UE is reset to the instructed DRX scheme.

In another UE controlled method, the UE may send information on DRX using the MSG3. Although, in that case extra information needs to be sent compared to the MSG3 of today. Also, then it is only possible to use DRX mode for MSG4 and not MSG2.

In the description, the eNodeB is said to be set in DRX mode using the selected DRX scheme for DL transmissions. Strictly speaking, the transmitter of the eNodeB is set in discontinuous transmission (TRX) mode with a TRX scheme that is in line with the selected DRX scheme. Although, to simplify, the eNodeB is said to be in DRX mode using the same DRX scheme as the receiver of the UE.

Figure 4:
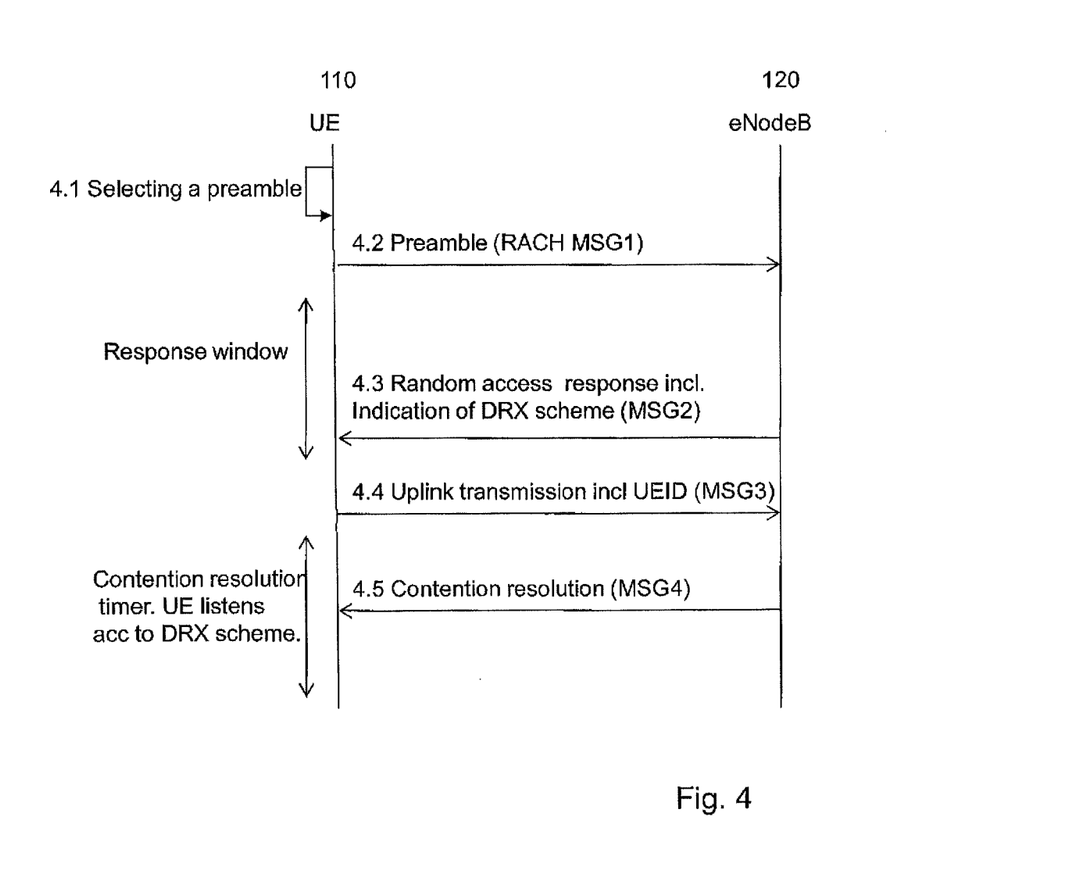
FIG. 4 is a signaling diagram of a random access procedure according to another possible embodiment of the invention.

FIG. 4 is a signaling diagram describing signaling between a UE and an eNodeB during a random access procedure according to another embodiment. In this embodiment, the eNodeB controls DRX scheme to be used. The signaling starts by the UE 110 selecting 4.1 a random access preamble and sending 4.2 the preamble to the eNodeB 120. The UE then actively listens for the Random Access Response (MSG2) during the response window. Before sending the MSG2, the eNodeB selects a DRX scheme to be used for communication in DRX mode between the eNodeB and the UE during the rest of the random access procedure. When deciding on which DRX scheme to select, the eNodeB may take into account e.g. UE priority level and/or system load status. Also, DRX scheme may be selected based on a value of the Contention resolution timer.

The eNodeB thereafter sends 4.3 the MSG2 to the UE. The MSG2 includes information on the selected DRX scheme. The MSG2 may also include information such as time advance command, UL grant and temporary C-RNTI. The UE and the eNodeB are then set in DRX mode according to the selected DRX scheme. Thereafter, the UE sends an uplink transmission including the UE identity. As soon as the MSG3 is sent, the UE wakes up and listen to a contention resolution message (MSG4) according to the selected DRX scheme. The eNodeB then responds 3.5 to the MSG3 with the MSG4. The MSG4 is sent in an active period as defined by the DRX scheme. The random access procedure succeeds after successful reception of MSG4. If not succeeded, the random access procedure, and the DRX mode according to the selected DRX pattern is stopped in order to retry to access again.

In an alternative embodiment, information of the selected DRX scheme can be sent from the eNodeB to the UE in an implicit way. For example, a predefined rule can be employed as a mapping between a UL grant resource location or a temporary C-RNTI value and the selected DRX pattern. In this way, it is also possible for a legacy UE to decode the information in MSG2, even though a legacy UE will not use DRX mode, and at the same time more advanced UEs can apply the DRX scheme information for power saving.

In embodiments for implicitly sending information of the selected DRX scheme, already existing information, such as a UL grant resource location or a temporary C-RNTI value, in the random access response message is used. Then the temporary C-RNTI or the UL grant resource location value is an indicator of the selected DRX scheme. Some kind of mapping may be used to connect a certain existing information value with a certain DRX pattern. In alternatives when the information of the selected DRX scheme is sent explicitly it may be sent as new information bits in the random access response message.

According to an alternative embodiment, a DRX cycle can be aligned with an MSG3 retransmission period, i.e. the UE is only awake according to the DRX scheme, when MSG3 want to retransmit, in which case it would be awake anyway. Thereby, further UE battery power is saved.

Figure 5:
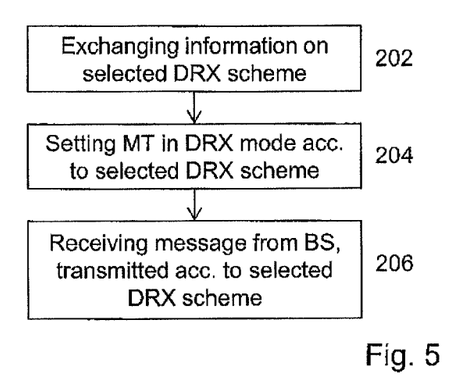
FIGS. 5-7 are flow charts of methods in a mobile terminal according to possible embodiments.

FIG. 5 describes an exemplary embodiment of a method in a mobile terminal 110 for communication with a base station 120 in a wireless network during a random access procedure. The method comprises exchanging 202, during the random access procedure, information on a selected DRX scheme to be used for communication between the mobile terminal and the base station in the random access procedure, setting 204 the mobile terminal in DRX mode according to the selected DRX scheme and receiving 206 at least one message from the base station during the random access procedure, wherein the at least one message was transmitted according to the selected DRX scheme.

Figure 6:
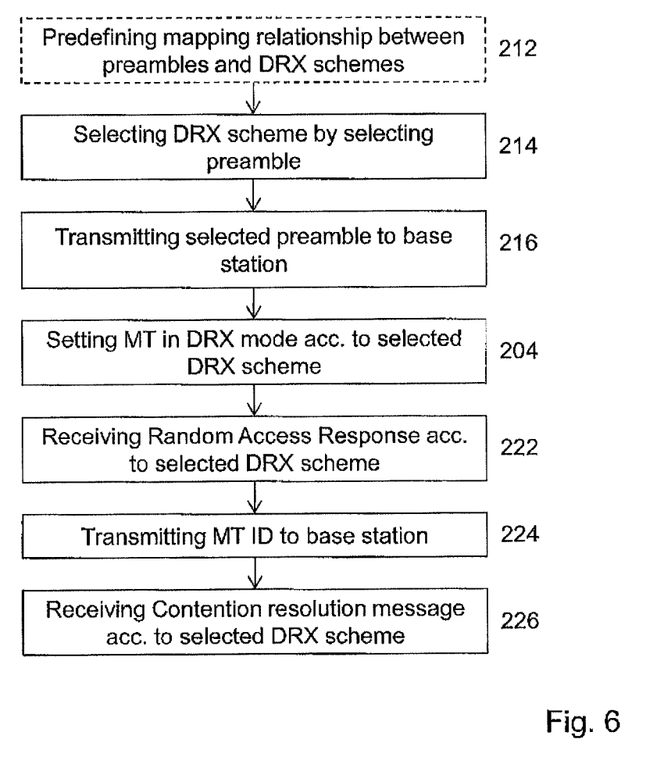

FIG. 6 describes another embodiment of a method in a mobile terminal for communication with a base station in a wireless network during a random access procedure. The method may start by in the mobile terminal predefining 212 a mapping relationship between preambles in a group of preambles and DRX schemes in a group of DRX schemes such that each DRX scheme is mapped to at least one preamble. The predefinition may be hardcoded or received in a message from the base station. Thereafter, information on the selected DRX scheme is exchanged between the mobile terminal and the base station by the mobile terminal selecting 214 DRX scheme out of the group of DRX schemes by selecting a preamble out of the group of preambles, which selected preamble is mapped to the selected DRX scheme. Then the selected preamble is transmitted 216 to the base station. The mapping between the selected preamble and the selected DRX scheme is known to the mobile terminal and the base station. Since the mapping is known also to the base station the base station can map the received preamble to the selected DRX scheme, and the base station can be set in DRX mode according to the selected DRX scheme. Further, the mobile terminal is set 204 in DRX mode according to the selected DRX scheme. Thereafter, a random access response message may be received 222 according to the selected DRX scheme. This means that the random access response message may be transmitted from the base station at time intervals defined by the DRX scheme, which time intervals are in line with the time intervals when the mobile terminal wakes up to listen to messages from the base station. Thereafter, a mobile terminal identifier may be transmitted 224 to the base station, followed by receiving 226 a contention resolution message from the base station, which contention resolution message may be transmitted according to the selected DRX scheme.

According to an embodiment, the mobile terminal selects 214 the DRX scheme based on UL traffic Quality of Service and/or mobile terminal power status. According to another embodiment, the mobile terminal may receive an instruction to use the selected DRX scheme or another DRX scheme from the base station in the random access response message (MSG2). In this embodiment the base station may control the final selection of DRX scheme even though the DRX scheme was originally selected by the mobile terminal. If this embodiment is used, the base station and the mobile terminal will not be set in DRX mode until after receiving this instruction in MSG2. As a result, only MSG4 and not MSG2 can be sent according to the selected DRX scheme.

Figure 7:
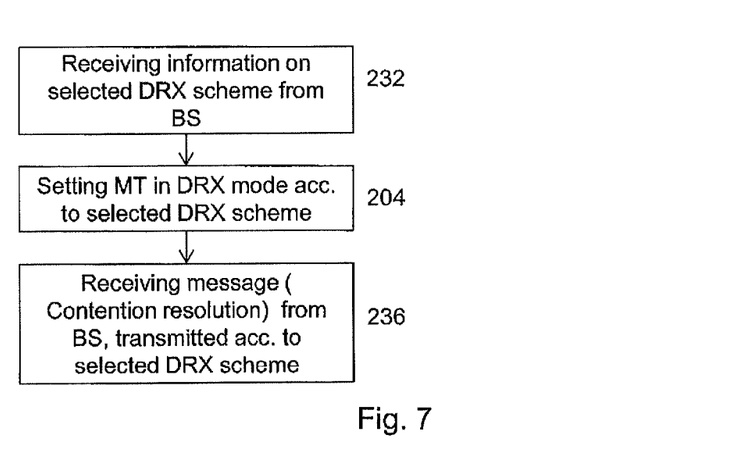

FIG. 7 describes yet another embodiment of a method in a mobile terminal for communication with a base station in a wireless network during a random access procedure. The method comprises receiving 232 information on a selected DRX scheme from the base station, setting 234 the mobile terminal in DRX mode according to the selected DRX scheme and receiving 236 a contention resolution message from the base station, which contention resolution message was transmitted from the base station according to the selected DRX scheme. The step of receiving 232 information on a selected DRX scheme from the base station may be seen as an example of the step of exchanging 202 information on a selected DRX scheme to be used for communication between the mobile terminal and the base station in the random access procedure, in which example the selection of DRX scheme is controlled by the base station. The information on the selected DRX scheme may be received 232 from the base station in a random access response message.

According to an embodiment, in which the base station controls the selection of DRX scheme, the mobile terminal receives 232 the information on the selected DRX scheme by receiving an indication from the base station to use a preamble that is mapped to the selected DRX scheme. The mapping is known to the mobile terminal and the base station. This embodiment is directed to a non-contention based selection of preamble. Since the mobile terminal is instructed to select a preamble mapped to a selected DRX scheme, which mapping is known both to the mobile terminal and the base station, both the mobile terminal and the base station will know which DRX scheme to use.

Figure 8:
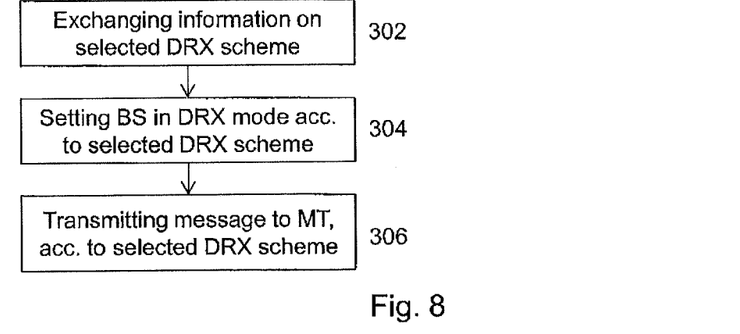
FIGS. 8-10 are flow charts of methods in a base station according to possible embodiments.

FIG. 8 describes an embodiment of a method in a base station for communication with a mobile terminal in a wireless network during a random access procedure. The method comprises exchanging 302, during the random access procedure, information on a selected DRX scheme to be used for communication between the mobile terminal and the base station in the random access procedure, setting 304 the base station in a DRX mode according to the selected DRX scheme, and transmitting 306 at least one message to the mobile terminal during the random access procedure, wherein the at least one message is transmitted according to the selected DRX scheme.

Figure 9:
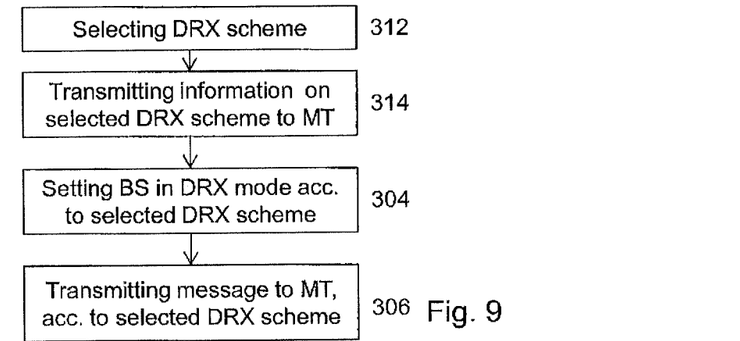

FIG. 9 describes another embodiment of a method in a base station for communication with a mobile terminal in a wireless network during a random access procedure. The method starts by the base station selecting 312 DRX scheme. The DRX scheme may be selected based on at least one of a mobile terminal priority level and a network load status. Alternatively, the DRX scheme may be selected to synchronize with Hybrid Automatic Repeat Request, HARQ, feedback. Further, information on the selected DRX scheme is exchanged between the mobile terminal and the base station by the base station transmitting 314 the information on the selected DRX scheme to the mobile terminal. The method may also comprise setting 304 the base station in DRX mode according to the selected DRX scheme and transmitting 306 a message to the mobile terminal according to the selected DRX scheme. In an embodiment, the information on the selected DRX scheme is transmitted 314 in a random access response message.

Figure 10:
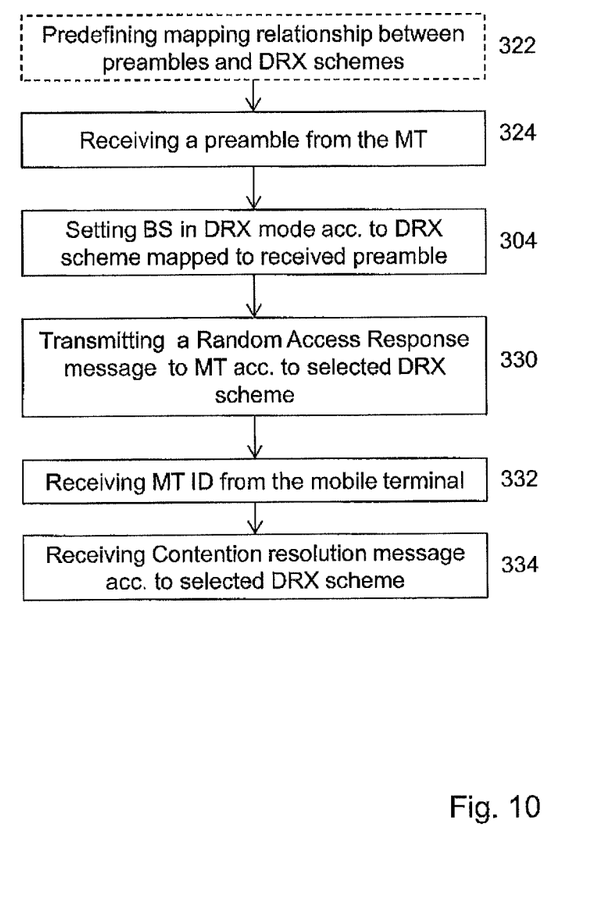

FIG. 10 describes yet another embodiment of a method in a base station for communication with a mobile terminal in a wireless network during a random access procedure. The method may start by in the base station predefining 322 a mapping relationship between preambles in a group of preambles and DRX schemes in a group of DRX schemes such that each DRX scheme is mapped to at least one preamble. The predefinition may be hardcoded or received in a message from the network. Thereafter, information on the selected DRX scheme is exchanged between the mobile terminal and the base station by the base station receiving 324 a preamble from the mobile terminal, which preamble is mapped to the selected DRX scheme, wherein the mapping between the preamble and the selected DRX scheme is known to the mobile terminal and the base station. The method may further comprise setting 304 the base station in a DRX mode according to the DRX scheme mapped to the received preamble, and transmitting 330 a random access response message to the mobile terminal. The random access response message may be transmitted according to the selected DRX scheme. Alternatively, the method further comprises transmitting an instruction to use the selected DRX scheme according to the preamble, or another DRX scheme to the mobile terminal in the random access response message. In that case, the random access response message may not be transmitted according to the selected DRX scheme. Further, the method may comprise receiving 332 a mobile terminal identifier from the mobile terminal, and transmitting 334 a contention resolution message to the mobile terminal, which contention resolution message is transmitted according to the selected DRX scheme.

Figure 11:
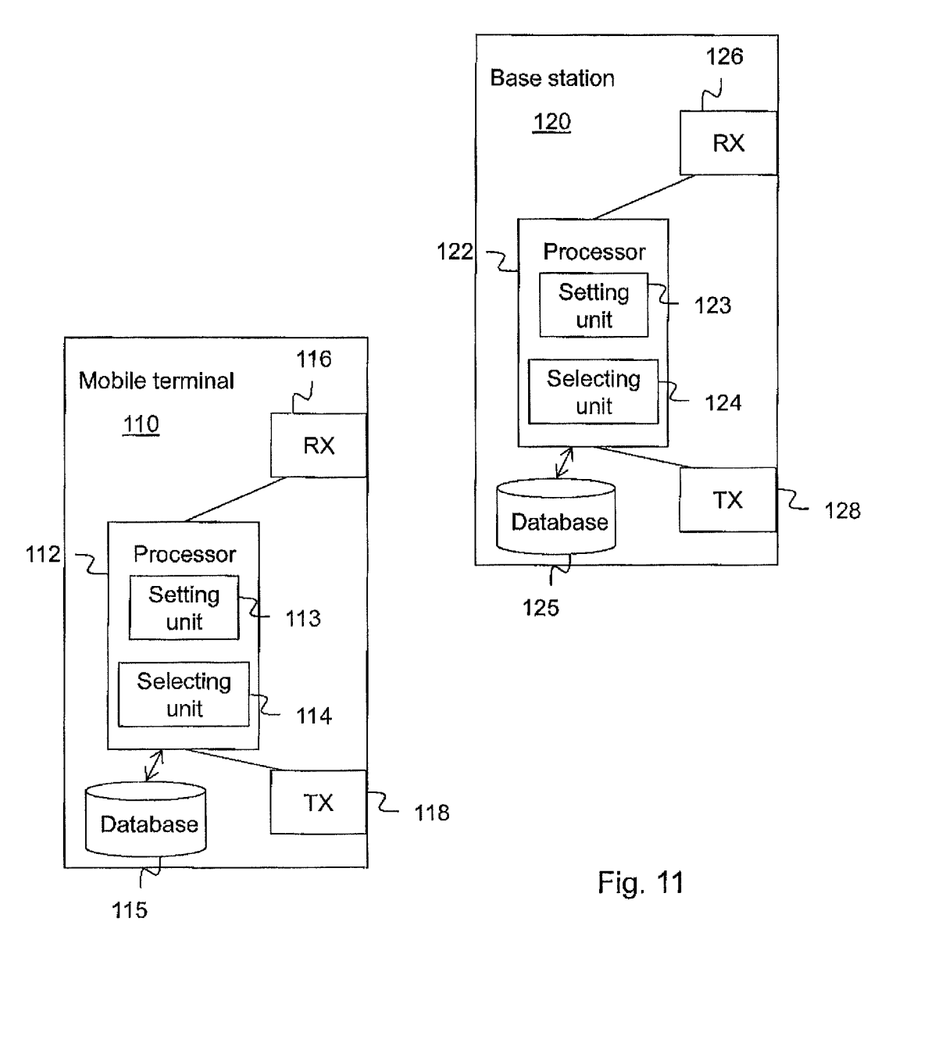
FIG. 11 is a schematic block diagram of a mobile terminal and a base station according to possible embodiments.

FIG. 11 describes a mobile terminal 110 and a base station 120 for mutual communication in a wireless network during a random access procedure. According to an embodiment, the mobile terminal is arranged for exchanging, during the random access procedure, with the base station 120, information on a selected DRX scheme to be used for communication between the mobile terminal and the base station in the random access procedure. Further, the mobile terminal 110 comprises a setting unit 113 for setting the mobile terminal in DRX mode according to the selected DRX scheme, and a receiver 116 for receiving at least one message from the base station during the random access procedure, wherein the at least one message was transmitted according to the selected DRX scheme. The setting unit 113 may be arranged in a processor 112.

According to an embodiment, for exchanging information on a selected DRX scheme with the base station during the random access procedure, the receiver 116 of the mobile terminal is arranged to receive the information on the selected DRX scheme from the base station. The information on the selected DRX scheme may be received in a random access response message. The information on the selected DRX scheme may be used by the setting unit when setting the mobile terminal in DRX mode according to the selected DRX scheme. The information on the selected DRX scheme may be stored in the database 115.

According to an embodiment, for exchanging information on a selected DRX scheme with the base station during the random access procedure, the mobile terminal has a selection unit 114 and a transmitter 118. The selection unit 114 is arranged for selecting DRX scheme out of a group of DRX schemes by selecting a preamble out of a group of preambles, which selected preamble is mapped to the selected DRX scheme. The selection unit 114 may be arranged in the processor 112. The transmitter 118 is arranged for transmitting the selected preamble to the base station, wherein the mapping between the selected preamble and the selected DRX scheme is known to the mobile terminal and the base station. When the selecting unit 114 selects the preamble it may fetch a preamble in a database 115 of the mobile terminal. Also, a mapping relationship is predefined between each of the preambles in the database and each of the DRX schemes such that each DRX scheme is mapped to at least one preamble. The mapping relationship between the preambles and the DRX schemes may be received from the base station or hardcoded in the mobile terminal. The mapping relationship may be stored in the database where it is accessible for the selection unit. Also the selected DRX scheme may be stored in the database 115 or in a memory in the processor 112.

According to an embodiment, the base station 120 is arranged for exchanging, during the random access procedure, with the mobile terminal, information on a selected DRX scheme to be used for communication between the mobile terminal and the base station in the random access procedure. The base station comprises a setting unit 123 for setting the base station in a DRX mode according to the selected DRX scheme, and a transmitter 128 for transmitting at least one message to the mobile terminal during the random access procedure, wherein the at least one message is transmitted according to the selected DRX scheme. The setting unit 123 may be arranged in a processor 122. The information on the selected DRX scheme may be used by the setting unit when setting the base station in DRX mode according to the selected DRX scheme. The information on the selected DRX scheme may be stored in a database 125.

According to an embodiment, for exchanging information on a selected DRX scheme with the mobile terminal during the random access procedure, the transmitter 128 of the base station 120 is arranged to transmit the information on the selected DRX scheme to the mobile terminal. The transmitter 128 may be arranged for transmitting the information on the selected DRX scheme in a random access response message. The base station may further comprise a selection unit 124 for selecting DRX scheme. The selection of DRX scheme may be based on at least one of a mobile terminal priority level and a network load status. The selection unit 124 may be arranged in the processor 122. The selection unit 114 may be arranged for selecting DRX scheme out of a group of DRX schemes, which group of DRX schemes may be stored in the database 125 or in an internal memory of the processor 122.

According to another embodiment, for exchanging information on a selected DRX scheme with the mobile terminal during the random access procedure, the base station 120 has a receiver 126 arranged to exchange the information on the selected DRX scheme by receiving a preamble from the mobile terminal 110, which preamble is mapped to the selected DRX scheme. The mapping between the preamble and the selected DRX scheme is known to the mobile terminal and the base station. Further, a mapping relationship is predefined between each of a group of preambles and each of a group of DRX schemes such that each DRX scheme is mapped to at least one preamble. The mapping relationship between the preambles and the DRX schemes may be received from the network or may be hardcoded in the base station. The mapping relationship may be stored in the database 125 where it is accessible for the processor 122. When receiving a preamble, the processor checks the mapping in e.g. the database and interprets that the received preamble is mapped to the selected DRX scheme. Also the selected DRX scheme may be stored in the database 125 or in an internal memory of the processor 122.

Further, the transmitter 128 may be arranged for transmitting, during the random access procedure, a random access response message and/or a contention resolution message to the mobile terminal according to the selected DRX scheme.

Although, the invention is described in terms of a 3GPP LTE-based system, it is not limited to such a system. It might as well be used for example for a HSPA based system, a W-CDMA based system etc.

The terms base station/eNodeB, and mobile terminal/user equipment are used in an interchangeable manner throughout this disclosure.

While the solution has been described with reference to specific exemplary embodiments, the description is generally only intended to illustrate the inventive concept and should not be taken as limiting the scope of the solution. The solution is defined by the appended claims.

The invention claimed is:

1. A mobile terminal for communication with a base station in a wireless network during a random access procedure, the mobile terminal being arranged for exchanging, during the random access procedure, with the base station, information on a selected discontinuous reception (DRX), scheme to be used for communication between the mobile terminal and the base station in the random access procedure comprising:
   a processor configured for setting the mobile terminal in a DRX mode according to the selected DRX scheme;
   a receiver for receiving at least one message from the base station during the random access procedure, wherein the at least one message was transmitted according to the selected DRX scheme,
   wherein the mobile terminal is arranged for exchanging the information on the selected DRX scheme by comprising:
   the processor configured for selecting the DRX scheme out of a group of DRX schemes by selecting a preamble out of a group of preambles, wherein the selected preamble is mapped to the selected DRX scheme, and
   a transmitter for transmitting the selected preamble to the base station, wherein the mapping between the selected preamble and the selected DRX scheme is known to the mobile terminal and the base station.

2. The mobile terminal according to claim 1, wherein the mobile terminal is arranged for exchanging the information on the selected DRX scheme by the receiver being arranged to receive the information on the selected DRX scheme from the base station.

3. The mobile terminal according to claim 2, wherein the receiver is arranged to receive the information on the selected DRX scheme from the base station in a random access response message.

4. The mobile terminal according to claim 1, wherein there is a mapping relationship between each of the preambles in the group of preambles and each of the DRX schemes in the group of DRX schemes such that each DRX scheme is mapped to at least one preamble, and wherein this mapping relationship is stored in the mobile terminal.

5. The mobile terminal according to claim 1, wherein the receiver is arranged for receiving, during the random access procedure, a random access response message and/or a contention resolution message transmitted from the base station according to the selected DRX scheme.

6. A base station for communication with a mobile terminal in a wireless network during a random access procedure, the base station being arranged for exchanging, during the random access procedure, with the mobile terminal, information on a selected discontinuous reception (DRX), scheme to be used for communication between the mobile terminal and the base station in the random access procedure, the base station further comprising:
   setting circuitry for setting the base station in a DRX mode according to the selected DRX scheme;
   a transmitter for transmitting at least one message to the mobile terminal during the random access procedure, wherein the at least one message is transmitted according to the selected DRX scheme;
   and a receiver arranged to exchange the information on the selected DRX scheme by receiving a preamble from the mobile terminal, wherein:
   the preamble is mapped to the selected DRX scheme, and the mapping between the preamble and the selected DRX scheme is known to the mobile terminal and the base station.

7. The base station according to claim 6, wherein the transmitter is arranged to exchange information on the selected DRX scheme by transmitting the information on the selected DRX scheme to the mobile terminal.

8. The base station according to claim 7, wherein the transmitter is further arranged for transmitting the information on the selected DRX scheme in a random access response message.

9. The base station according to claim 7, further comprising a selection unit for selecting DRX scheme based on at least one of a mobile terminal priority level and a network load status.

10. The base station according to claim 6, wherein the transmitter is arranged for transmitting, during the random access procedure, a random access response message and/or a contention resolution message to the mobile terminal according to the selected DRX scheme.

* * * * *